US012704982B2

(12) United States Patent
Avagyan et al.

(10) Patent No.: US 12,704,982 B2
(45) Date of Patent: Aug. 11, 2026

(54) LOWERING EMERGENCY CAPACITY RESERVATIONS FOR STORAGE SYSTEMS

(71) Applicant: Google LLC, Mountain View, CA (US)

(72) Inventors: Grigor Avagyan, Redmond, WA (US); Steven Randel Soltis, Rochester, MN (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 18/224,277

(22) Filed: Jul. 20, 2023

(65) Prior Publication Data

US 2025/0028459 A1 Jan. 23, 2025

(51) Int. Cl.
*G06F 3/06* (2006.01)

(52) U.S. Cl.
CPC .......... *G06F 3/0626* (2013.01); *G06F 3/0653* (2013.01); *G06F 3/0689* (2013.01)

(58) Field of Classification Search
CPC ..... G06F 3/0626; G06F 3/0653; G06F 3/0689
See application file for complete search history.

(56) References Cited

U.S. PATENT DOCUMENTS 5,933,422 A 8/1999 Kusano et al.
7,971,025 B2 6/2011 Murase et al.
8,316,176 B1 * 11/2012 Phan .................. G06F 12/0246 365/185.33
8,521,972 B1 8/2013 Boyle et al.
9,229,652 B2 1/2016 Satoyama et al.
9,311,375 B1 * 4/2016 Naik .................... G06F 16/275
9,471,225 B2 10/2016 Bobroff et al.
9,817,755 B2 11/2017 Feldman et al.
9,961,675 B1 5/2018 Reed et al.
10,235,285 B1 3/2019 Wallace
10,346,297 B1 7/2019 Wallace
10,795,812 B1 10/2020 Duggal et al.
10,846,216 B2 11/2020 Davis et al.
11,093,146 B2 8/2021 Karr et al.
11,200,164 B2 12/2021 Harris et al.
11,416,391 B2 8/2022 Muchherla et al.
11,507,305 B2 11/2022 Truong et al.

(Continued)

FOREIGN PATENT DOCUMENTS

CN 115344539 A 11/2022

OTHER PUBLICATIONS

Boutaba et al. Elastic Optical Networking for SG Transport. Journal of Network and Systems Management, Springer US, New York, vol. 25, No. 4, Sep. 30, 2017 (Sep. 30, 2017), pp. 819-847, DOI: 10.1007/SI0922-017-9434-Z.

(Continued)

*Primary Examiner* — Nanci N Wong
(74) *Attorney, Agent, or Firm* — Lerner David LLP

(57) ABSTRACT

Aspects of the disclosure are directed to reducing or eliminating emergency capacity usage in a storage system by including an in-process space reclamation and/or one or more mitigation mechanisms. The in-process space reclamation can be implemented in addition to a background space reclamation. The one or more mitigation mechanisms can be associated with a basis for write requests. The in-process space reclamation and/or mitigation mechanisms allow for lowering emergency capacity reservation, thus saving storage costs.

12 Claims, 6 Drawing Sheets

(56) References Cited

U.S. PATENT DOCUMENTS

| | | | | |
|---|---|---|---|---|
| 2002/0068612 | A1 | 6/2002 | Carey et al. | |
| 2012/0030260 | A1 | 2/2012 | Lu et al. | |
| 2014/0233956 | A1 | 8/2014 | Zami | |
| 2014/0237164 | A1* | 8/2014 | Le | G06F 12/0246 711/103 |
| 2014/0281127 | A1* | 9/2014 | Marcu | G06F 12/0238 711/103 |
| 2015/0334264 | A1* | 11/2015 | Matsuno | H04N 1/215 348/231.1 |
| 2016/0054931 | A1* | 2/2016 | Romanovsky | G06F 3/0643 711/103 |
| 2017/0123972 | A1* | 5/2017 | Gopinath | G06F 3/0616 |
| 2018/0081543 | A1* | 3/2018 | Muchherla | G06F 11/34 |
| 2018/0203612 | A1 | 7/2018 | Kats et al. | |
| 2020/0150873 | A1* | 5/2020 | Saxena | G06F 3/0644 |
| 2020/0241902 | A1* | 7/2020 | Freche | G06F 9/45545 |
| 2022/0083280 | A1* | 3/2022 | Su | G06F 12/10 |
| 2023/0236768 | A1* | 7/2023 | Patil | G06F 3/0611 |
| 2024/0012579 | A1* | 1/2024 | Helmick | G06F 12/0246 |
| 2024/0086362 | A1* | 3/2024 | Wang | G06F 16/1858 |
| 2024/0119765 | A1* | 4/2024 | Hayashi | G07C 5/085 |

OTHER PUBLICATIONS

International Search Report and Written Opinion for International Application No. PCT/US2022/050255 dated Mar. 22, 2023. 19 pages.

Extended European Search Report for European Patent Application No. 24189589.5 dated Nov. 28, 2024. 8 pages.

* cited by examiner

LOWERING EMERGENCY CAPACITY RESERVATIONS FOR STORAGE SYSTEMS

BACKGROUND

Storage systems can include mechanisms for increasing storage space, such as space reclamation and/or thin provisioning, but these mechanisms create a risk of running out of storage capacity if either mechanism malfunctions. To avoid this risk, storage systems can provision some storage capacity for emergencies to keep the storage system running until the underlying issues are resolved or mitigated. Even though this emergency storage may be rarely used, it can still occupy a significant portion of the overall storage capacity, resulting in wasted storage space.

BRIEF SUMMARY

Aspects of the disclosure are directed to reducing or eliminating emergency capacity usage in a storage system by including an in-process space reclamation and/or one or more mitigation mechanisms. The in-process space reclamation can be implemented in addition to a background space reclamation. The one or more mitigation mechanisms can be associated with a basis for write requests. The in-process space reclamation and/or mitigation mechanisms allow for lowering emergency capacity reservation, thus saving storage costs.

An aspect of the disclosure provides for a method for reducing emergency storage capacity of a storage system, the method including: monitoring, by one or more processors, an amount of time since a background space reclamation has been performed; determining, by the one or more processors, that the amount of time meets or exceeds an idling threshold; and in response to determining that the amount of time meets or exceeds the idling threshold, triggering, by the one or more processors, an in-process space reclamation that is bound to one or more write processes for the storage system.

In an example, the in-process space reclamation is bound to the one or more write processes by running on the same hardware and having the same software package as the one or more write processes.

In another example, the method further includes: monitoring, by the one or more processors, a file density for the storage system; determining, by the one or more processors, that the file density meets or is below a density threshold; and in response to determining that the file density meets or is below the density threshold, triggering, by the one or more processors, the in-process space reclamation. In yet another example, the method further includes: monitoring, by the one or more processors, a storage usage for the storage system; determining, by the one or more processors, that the storage usage meets or exceeds a storage usage threshold; and in response to determining that the storage usage meets or exceeds the storage usage threshold, triggering, by the one or more processors, the in-process space reclamation.

In yet another example, the method further includes, in response to determining the storage usage meets or exceeds the storage usage threshold, adjusting, by the one or more processors, a basis for the write processes. In yet another example, adjusting the basis for the write processes further includes routing incoming traffic or a portion of the incoming traffic to a hard disk drive (HDD) if the storage system is a solid state drive (SSD) or to a SSD if the storage system is a HDD. In yet another example, adjusting the basis for the write processes further includes transcoding data to a more efficient storage encoding. In yet another example, adjusting the basis for the write processes further includes moving data to at least one of a wider redundant array of independent disks (RAID), remote storage, or storage at a different geographical location. In yet another example, adjusting the basis for the write processes further includes initiating compression of incoming traffic or increasing a compression ratio for the incoming traffic.

In yet another example, the storage usage threshold includes multiple threshold levels and different mitigation mechanisms are performed at each of the multiple threshold levels.

In yet another example, the method further includes, in response to determining that the amount of time meets or exceeds the idling threshold, triggering, by the one or more processors, a space reclamation that runs on older software than the in-process space reclamation.

Another aspect of the disclosure provides for a system including: one or more processors; and one or more storage devices coupled to the one or more processors and storing instructions that, when executed by the one or more processors, cause the one or more processors to perform operations for reducing emergency storage capacity, the operations including: monitoring an amount of time since a background space reclamation has been performed; determining that the amount of time meets or exceeds an idling threshold; and in response to determining that the amount of time meets or exceeds the idling threshold, triggering an in-process space reclamation that is bound to one or more write processes for the storage system.

In an example, the in-process space reclamation is bound to the one or more write processes by running on the same hardware and having the same software package as the one or more write processes.

In another example, the operations further include: monitoring a file density for the storage system; determining that the file density meets or is below a density threshold; and in response to determining that the file density meets or is below the density threshold, triggering the in-process space reclamation. In yet another example, the operations further include: monitoring a storage usage for the storage system; determining that the storage usage meets or exceeds a storage usage threshold; and in response to determining that the storage usage meets or exceeds the storage usage threshold, triggering the in-process space reclamation.

In yet another example, the operations further include, in response to determining the storage usage meets or exceeds the storage usage threshold, adjusting a basis for the write processes.

Yet another aspect of the disclosure provides for a non-transitory computer readable medium for storing instructions that, when executed by one or more processors, cause the one or more processors to perform operations for reducing emergency storage capacity, the operations including: monitoring an amount of time since a background space reclamation has been performed; determining that the amount of time meets or exceeds an idling threshold; and in response to determining that the amount of time meets or exceeds the idling threshold, triggering an in-process space reclamation that is bound to one or more write processes for the storage system.

In an example, the operations further include: monitoring a file density for the storage system; determining that the file density meets or is below a density threshold; and in response to determining that the file density meets or is below the density threshold, triggering the in-process space reclamation. In another example, the operations further include: monitoring a storage usage for the storage system; determining that the storage usage meets or exceeds a storage usage threshold; and in response to determining that the storage usage meets or exceeds the storage usage threshold, triggering the in-process space reclamation.

In yet another example, the operations further include, in response to determining the storage usage meets or exceeds the storage usage threshold, adjusting a basis for the write processes.

DETAILED DESCRIPTION

Figure 1:
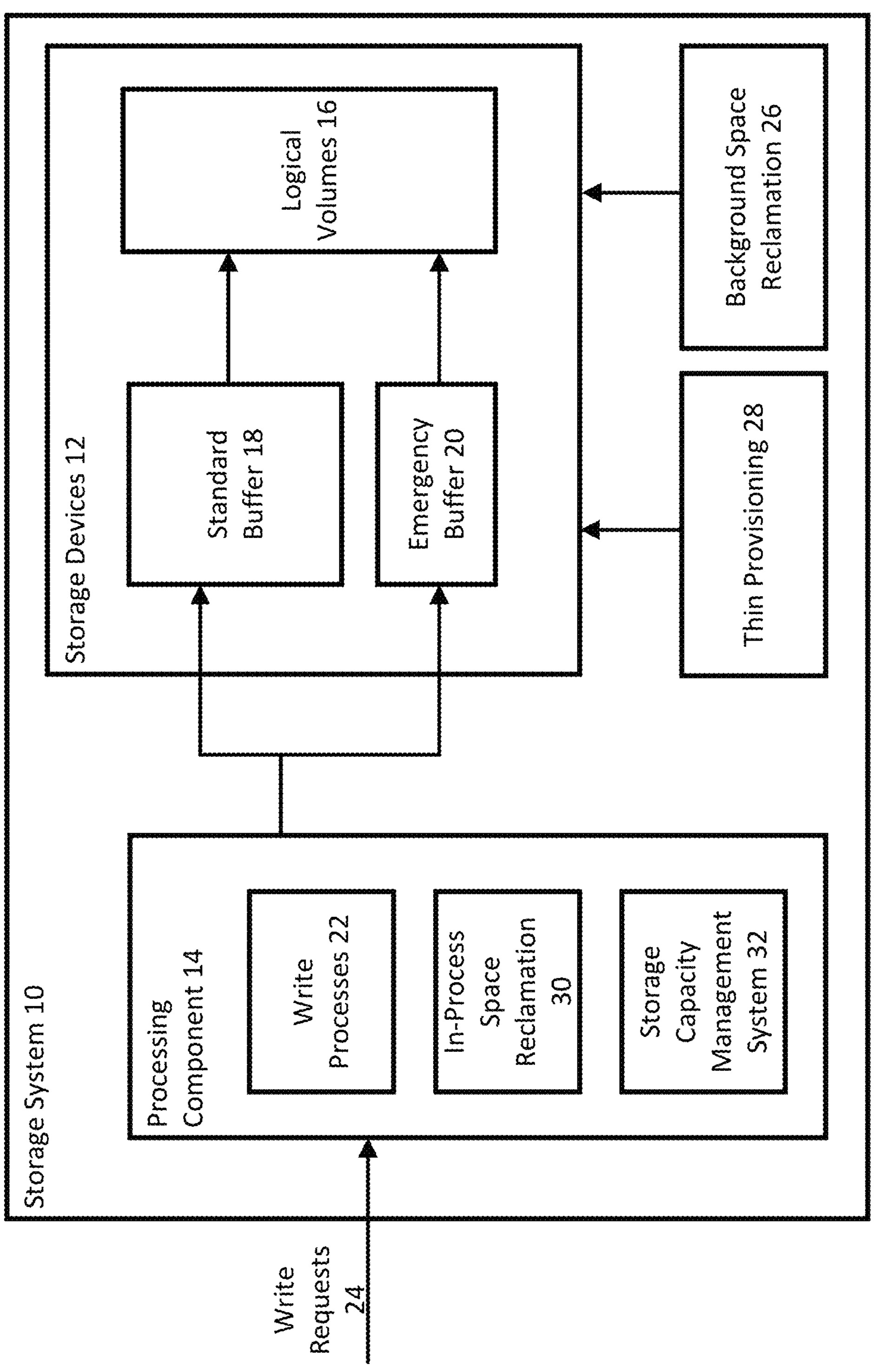
FIG. 1 depicts a block diagram of an example storage system according to aspects of the disclosure.

The technology relates generally to fallback mechanisms that reduce or eliminate emergency capacity usage in a storage system. The fallback mechanisms can include in-process space reclamation implemented in addition to background space reclamation. The fallback mechanisms can further include monitoring storage usage and implementing mitigation mechanisms in response to storage usage meeting a threshold. The in-process space reclamation and/or monitoring of storage usage allow for lowering emergency capacity reservation, thus saving storage costs.

The storage system can include a plurality of storage devices and logical volumes associated with the storage devices. The storage devices can include a standard buffer and an emergency buffer. The storage system can further include a processing component configured to receive write requests. In response to a write request, the processing component can map capacity from the standard buffer to one or more of the logical volumes or map capacity from the emergency buffer to one or more of the logical volumes when the standard buffer runs low on capacity. The processing component can route the write requests to the standard buffer or the emergency buffer based on the mapping.

To optimize or generally improve storage space utilization, the storage system can utilize space reclamation, also referred to as garbage collection, and/or thin provisioning. Space reclamation can correspond to reclaiming storage space occupied by data that is no longer useful, such as data occupied by deleted files or objects, or data occupied by blocks that have since been overwritten. For example, a log structured storage system appends new data to the end of the log files and reclaims the overwritten space later through compaction. Space reclamation can be a background process separate from processes responsible for writing data and run by a separate pool of computing resources. Thin provisioning can correspond to overcommitting storage resources in a shared multi-tenant storage environment to optimize or improve storage usage. For example, the logical volume capacity can exceed the storage device capacity. The overcommitting can be based on statistical models that predict actual storage usage using historical data.

Space reclamation and thin provisioning allow for increasing storage space in the storage system but create a risk of running out of storage capacity if either mechanism malfunctions, such as if space reclamation is down or running at degraded capacity due to software glitches or hardware problems or if thin provisioning miscalculates actual storage usage. To avoid this risk, the storage system can provision some storage capacity for emergencies, referred to as the emergency buffer, to keep the storage system running until the underlying issues are resolved or mitigated, such as repairing space reclamation or acquiring new storage capacity. Even though the emergency buffer may be rarely used, e.g., less than one-hundredth of a percentage of time the storage system is in use, the emergency buffer can still occupy a significant portion of the overall storage capacity, e.g., an eighth to a third of overall storage capacity.

To reduce or eliminate the emergency buffer capacity, thus increasing storage capacity, the storage system can include a second space reclamation as a fallback to the space reclamation that runs in the background. The second space reclamation can run in-process and share a fate with or be bound to components performing writes to the storage system. By running in-process, the second space reclamation is run by one or more threads of a computer program that share the same memory address space as threads performing writes to the storage system. By sharing a fate or being bound, the second space reclamation can run on the same hardware and/or have the same software package as the processing component performing writes. Therefore, if the second space reclamation malfunctions, either due to hardware or software issues, the processing component performing writes also malfunctions, so the risk of running out of capacity in the storage system is mitigated. With a second space reclamation tied to the processing component performing writes, the emergency buffer size can be reduced, leading to saving on overall storage costs.

For example, the second space reclamation can be implemented in a block-level storage system that exposes a block device network interface for virtual machines. In a block storage system, a logical block of data can be written and overwritten numerous times throughout a lifetime of that logical block. A hypervisor of the block level storage system can intercept read/write requests from the virtual machines and append every new write to a backend log file. A background space reclamation can periodically traverse and compact the log files. The hypervisor can monitor the log files for the last-compacted timestamp. The hypervisor can determine the last-compacted timestamp is equal to or earlier than a threshold, such as by comparing the last-compacted timestamp to a configurable threshold greater than a frequency at which background compactions run. In response to the determination, the hypervisor can trigger the second space reclamation to perform compaction in-process using the same software that performs the writes.

Additionally or alternatively, the hypervisor can trigger the second space reclamation to perform compaction in-process if the hypervisor determines a file density, e.g., percent of blocks not overwritten, is equal to or below a threshold, such as by comparing the file density to a configurable threshold lower than a threshold used for the background space reclamation compactions. As another example, while the second space reclamation is performing compaction in-process, the hypervisor can transcode data to a more efficient encoding, e.g., convert from replicated encoding to a Reed-Solomon encoding or switch to a Reed-Solomon encoding with a wider schema, to further reduce storage costs. As yet another example, the hypervisor can receive an external trigger to initiate the in-process compactions. For instance, the hypervisor can receive a trigger from other software monitoring log files, file density, and/or storage capacity or the hypervisor can receive a manual trigger provided by an operator. As yet another example, the hypervisor can determine the storage system is running low on available resources and, in response, can trigger the second space reclamation to perform compaction in-process. As yet another example, the storage system can include a third space reclamation, either in-process or background, that runs on previous versions of software to counteract potential software glitches when newer software is deployed.

To further reduce or eliminate the emergency buffer capacity, thus increasing storage capacity, the storage system can include storage usage monitoring. The monitoring can determine that the storage usage is equal to or above a threshold, such as by comparing a storage amount to a configurable percentage threshold. In response to the determination, the monitoring can trigger one or more mitigation mechanisms to slow down storage usage in the storage system. The one or more mitigation mechanisms can slow down storage usage by adjusting a basis for write requests, such as storage placement, encoding, and/or compression, as opposed to adjusting how the write requests are serviced, such as by throttling, delaying, prioritizing, and/or canceling write requests. By dynamically implementing the mitigation mechanisms, the emergency buffer size can be reduced, leading to saving on overall storage costs.

The one or more mitigation mechanisms can include selectively routing, fully or partially, traffic to an additional storage device, such as a second standard buffer on a second storage device of a storage system. For example, traffic can be routed to a hard disk drive (HDD) if the storage system is a solid state drive (SSD), traffic can be routed to a SSD if the storage system is a HDD, and/or traffic can be routed to a combination of HDD and SSD if the storage system is either a SSD or HDD. As another example, traffic can be routed to a wider redundant array of independent disks (RAID) storage, remote storage like a public storage provider, and/or storage at a different geographical location with spare storage capacity. The one or more mitigation mechanisms can further include transcoding data to more efficient storage encoding, such as Reed-Solomon encoding or a wider Reed-Solomon schema if the storage system implements replicated writes. For example, the second storage device can be a Reed-Solomon encoded storage device, a more byte efficient storage device, or a wider Reed-Solomon encoded storage device. The one or more mitigation mechanisms can further include compressing incoming traffic or implementing more efficient compression, such as compression based on different compression levels, e.g., Zstandard compression levels, with a higher compression ratio. The one or more mitigation mechanisms can further include triggering in-process space reclamation, as described earlier.

For example, referring back to the block-level storage system described earlier, the hypervisor can monitor storage usage. For example, the hypervisor can monitor storage usage percentage and/or storage usage amount. The hypervisor can determine the storage usage is equal to or above a threshold, such as by comparing the storage usage to a configurable threshold percentage or amount of storage usage. In response to the determination, the hypervisor can trigger one or more of the mitigation mechanisms described earlier. As the mitigation mechanisms are occurring, the hypervisor can continue to monitor the storage usage. The hypervisor can determine the storage usage is below the threshold and, in response, restore normal operations by deactivating the one or more mitigation mechanisms.

The storage system can include multiple thresholds associated with varying degrees of severity, with different mitigation mechanisms implemented depending on the threshold reached. For example, the multiple thresholds can include a threshold at 80% storage capacity, 90% storage capacity, and 95% storage capacity. At 80% storage capacity, the hypervisor can trigger to partially write data to HDD. At 90% storage capacity, the hypervisor can trigger using compression. At 95% storage capacity, the hypervisor can trigger a 50% bandwidth throttling. The multiple thresholds can also be associated with varying classes of storage. For example, higher performance storage, e.g., SSD, can have higher thresholds than lower performance storage, e.g., HDD, for triggering the different mitigation mechanisms.

FIG. 1 depicts a block diagram of an example storage system 10. The storage system 10 can include a plurality of storage devices 12 and a processing component 14. The storage devices 12 can include one or more logical volumes 16, a standard buffer 18, and an emergency buffer 20. The processing component 14 can include one or more write processes or threads 22. The processing component 14 can be configured to receive one or more write requests 24, map capacity from the standard buffer 18 to the logical volumes 16, and route the write requests 24 to the standard buffer 18 based on the mapping. If the standard buffer 18 is running low on capacity, the processing component 14 can map capacity from the emergency buffer 20 to the logical volumes 16 and route the write requests 24 to the emergency buffer 20 based on the mapping.

The storage system 10 can implement background space reclamation 26 and/or thin provisioning 28 to optimize storage space in the storage device 12. Space reclamation can correspond to reclaiming storage space occupied by data that is no longer useful, such as data occupied by deleted files or objects, or data occupied by blocks that have since been overwritten. The background space reclamation 26 can be separate from the processing component 14 and run by a separate pool of computing resources. Thin provisioning 28 can correspond to overcommitting storage resources of the storage devices 12. For example, the capacity of the logical volumes 16 can exceed the capacity of the storage devices 12. The overcommitting can be based on statistical models that predict actual storage usage using historical data.

To reduce or eliminate the emergency buffer 20, the storage system 10 can include one or more in-process space reclamations 30 as a fallback to the background space reclamation 26. The in-process space reclamation 30 can share a fate with or be bound to the write processes 22, such as by running on the same hardware and/or having the same software package as the write processes 22. To further reduce or eliminate the emergency buffer 20, the storage system 10 can include a storage capacity management system 32. The storage capacity management system 32 can determine one or more metrics for monitoring storage usage of the storage devices 12 meet one or more respective thresholds. In response, the storage capacity management system 32 can trigger one or more mitigation mechanisms to slow down storage usage in the storage system 10. The one or more mitigation mechanisms can slow down storage usage by adjusting a basis for write requests 24, such as storage placement, encoding, and/or compression, as opposed to adjusting how the write requests 24 are serviced, such as by throttling, delaying, prioritizing, and/or canceling write requests 24.

Figure 2:
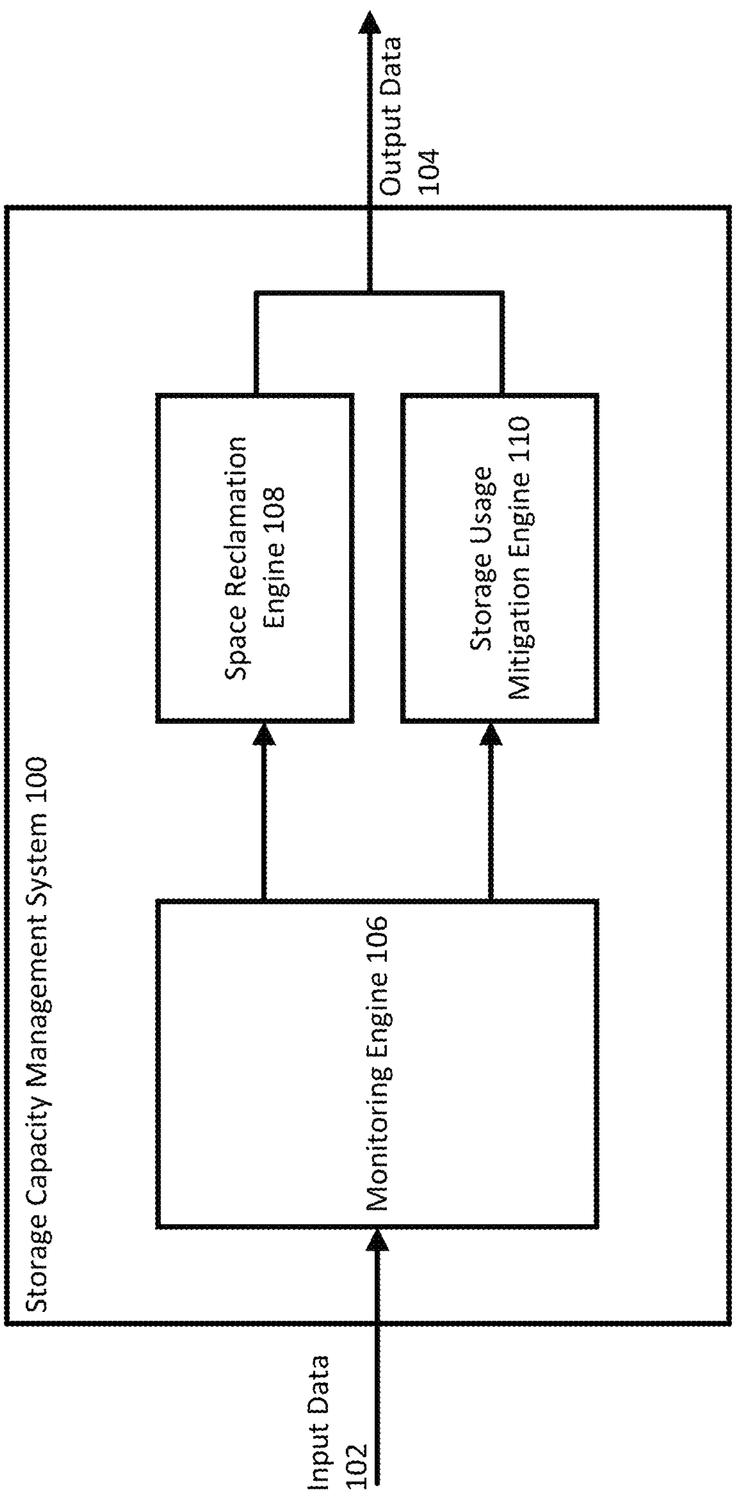
FIG. 2 depicts a block diagram of an example storage capacity management system for one or more storage systems according to aspects of the disclosure.

FIG. 2 depicts a block diagram of an example storage capacity management system 100 for one or more storage systems, such as for a cloud-based platform. An example cloud-based platform may provide a suite of cloud computing services. The storage capacity management system 100 can correspond to the storage capacity management system 32 as depicted in FIG. 1. The cloud-based platform can provide for services that allow for provisioning or maintaining compute resources and/or applications, such as data centers, cloud environments, and/or container frameworks. For example, the cloud-based platform can be used as a service that provides software applications, such as accounting, word processing, inventory tracking, etc. As another example, the infrastructure of the platforms can be partitioned in the form of virtual machines or containers on which software applications are run.

The storage capacity management system 100 can be configured to receive input data 102 for controlling storage capacity of the storage systems. For example, the storage capacity management system 100 can receive the input data 102 as part of a call to an application programming interface (API) exposing the storage capacity management system 100 to one or more computing devices. The input data 102 can also be provided to the storage capacity management system 100 through a storage medium, such as remote storage connected to the one or more computing devices, over a network. The input data 102 can further be provided as input through a user interface on a user computing device coupled to the storage capacity management system 100.

The input data 102 can include data associated with whether to initiate one or more in-process space reclamations and/or one or more mitigation mechanisms. For example, the input data 102 can include timestamps for compacting log files associated with read/write requests for software applications of the cloud based platform. As another example, the input data 102 can include a file density for files of the storage systems, such as a percentage of blocks of a storage system not overwritten. As yet another example, the input data 102 can include storage usage levels, such as a percentage or storage usage amount of a storage system. As yet another example, the input data 102 can include instructions to trigger the in-process space reclamation and/or one or more mitigation mechanisms, such as from a server computing device or user computing device.

From the input data 102, the storage capacity management system 100 can be configured to output one or more results related to controlling storage capacity of the storage system, generated as output data 104. The output data 104 can include instructions associated with one or more in-process space reclamations and/or one or more mitigation mechanisms. For example, the output data 104 can include instructions to trigger the in-process space reclamation. The in-process space reclamation can be run by one or more threads of a computer program that share the same memory address space as processing components performing writes to the storage system. The in-process space reclamation can further share a fate or be bound to the processing components performing writes to the storage system, such as running on the same hardware and/or having the same software package. The in-process space reclamation can also run on previous versions of software packages.

As another example, the output data 104 can include instructions to trigger one or more mitigation mechanisms to slow down storage usage in the storage system by adjusting a basis for write requests. The one or more mitigation mechanisms can include selectively routing traffic to other storage devices, transcoding data to more efficient storage encoding, and/or performing compression on incoming traffic.

The storage capacity management system 100 can be configured to provide the output data 104 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model.

The storage capacity management system 100 can further be configured to forward the output data 104 to one or more other devices configured for translating the output data 104 into an executable program written in a computer programming language or machine-readable code and optionally as part of a framework for controlling storage capacity. The storage capacity management system 100 can also be configured to send the output data 104 to a storage device for storage and later retrieval. The storage capacity management system 100 can further be configured to send the output data 104 for display, such as on a user display.

The storage capacity management system 100 can include a monitoring engine 106, a space reclamation engine 108, and a storage usage mitigation engine 110. The monitoring engine 106, space reclamation engine 108, and/or storage usage mitigation engine 110 can be implemented as one or more computer programs, specially configured electronic circuitry, or any combination thereof.

The monitoring engine 106 can be configured to monitor one or more metrics for determining whether to initiate one or more in-process space reclamations and/or one or more mitigation mechanisms. The one or metrics can include a last-compacted timestamp for read/write requests, file density, storage usage levels, and/or whether a trigger was received. For example, the monitoring engine 106 can monitor log files appended to writes for a last-compacted timestamp included in the log files. The monitoring engine 106 can determine that the last-compacted timestamp meets a threshold, such as by being equal to or earlier than a threshold. The monitoring engine 106 can determine the last-compacted timestamp meets the threshold by comparing the last-compacted timestamp to a configurable threshold that is greater than a frequency at which background compactions may run. As another example, the monitoring engine 106 can monitor the file density, such as a percentage of overwritten blocks, in the storage system. The monitoring engine 106 can determine the file density meets a threshold, such as by being equal to or below a threshold. The monitoring engine 106 can determine the file density meets the threshold by comparing the file density to a configurable threshold that is lower than a threshold used for background space reclamation compactions. As yet another example, the monitoring engine 106 can monitor the storage usage, such as a percentage or storage usage amount of a storage system or available storage in a storage system. The monitoring engine 106 can determine the storage usage meets a threshold, such as by being equal to or above a threshold. The monitoring engine 106 can determine the storage usage meets a threshold by comparing the storage amount, percentage available, and/or capacity available to a configurable threshold. As yet another example, the monitoring engine 106 can monitor for and determine whether a trigger was received for performing in-process space reclamation and/or mitigation mechanisms.

In response to one or more of the determinations from the monitoring engine 106, the space reclamation engine 108 can be configured to initiate one or more space reclamations, such as in addition to a background space reclamation already being run. The one or more space reclamations can include an in-process space reclamation and/or an un-updated space reclamation. The in-process space reclamation can be run by one or more threads of a computer program that shares the same memory address space as threads performing writes to the storage system. The in-process space reclamation can further share a fate or be bound to the threads performing writes to the storage system, such as by running on the same hardware and/or having the same software package as the threads performing writes. The un-updated space reclamation can run on previous versions of software to counteract potential software glitches when newer software is deployed. The un-updated space reclamation can be an in-process space reclamation as well.

In response to the one or more determinations from the monitoring engine 106, the storage usage mitigation engine 110 can be configured to initiate one or more mitigation mechanisms to slow down storage usage by adjusting a basis for write requests, as opposed to adjusting how the write requests are serviced. Adjusting a basis for the write requests can include adjusting storage placement, encoding, and/or compression while adjusting how the write requests are serviced can include throttling, delaying, prioritizing, and/or canceling write requests. For example, adjusting storage placement can include the storage usage mitigation engine 110 selectively routing, fully or partially, traffic to one or more additional storage devices. The storage usage mitigation engine 110 can route traffic to an additional buffer, a different type of storage device like SSD and/or HDD, a wider RAID storage, remote storage like public storage, and/or storage at a different geographical location. As another example, adjusting encoding can include the storage usage mitigation engine 110 transcoding data to more efficient storage encoding. The storage usage mitigation engine 110 can transcode data to Reed-Solomon encoding or to a wider Reed-Solomon encoding schema if Reed-Solomon encoding is already occurring. As yet another example, adjusting compression can include the storage usage mitigation engine 110 implementing more efficient compression. The storage usage mitigation engine 110 can implement compression to incoming traffic or implement more efficient compression, such as compression based on different compression levels, e.g., Zstandard compression levels, with a higher compression ratio.

The space reclamation engine 108 and/or the storage usage mitigation engine 110 can respectively initiate one or more space reclamations and/or one or more mitigation mechanisms based on the determined thresholds from the monitoring engine 106 and/or different levels of thresholds determined by monitoring engine 106. For example, the space reclamation engine 108 can initiate in-process space reclamation in response to the monitoring engine 106 determining the last-compacted timestamp meets a threshold while the storage usage mitigation engine 110 can initiate adjusting storage placement in response to the monitoring engine 106 determining the storage usage meets a threshold. As another example, the storage usage mitigation engine 110 can initiate adjusting storage placement in response to the monitoring engine 106 determining the storage usage meets a first threshold and can initiate adjusting compression in response to the monitoring engine 106 determining the storage usage meets a second threshold higher than the first threshold. Multiple thresholds can be associated with varying classes or storage like SSD and HDD.

Figure 3:
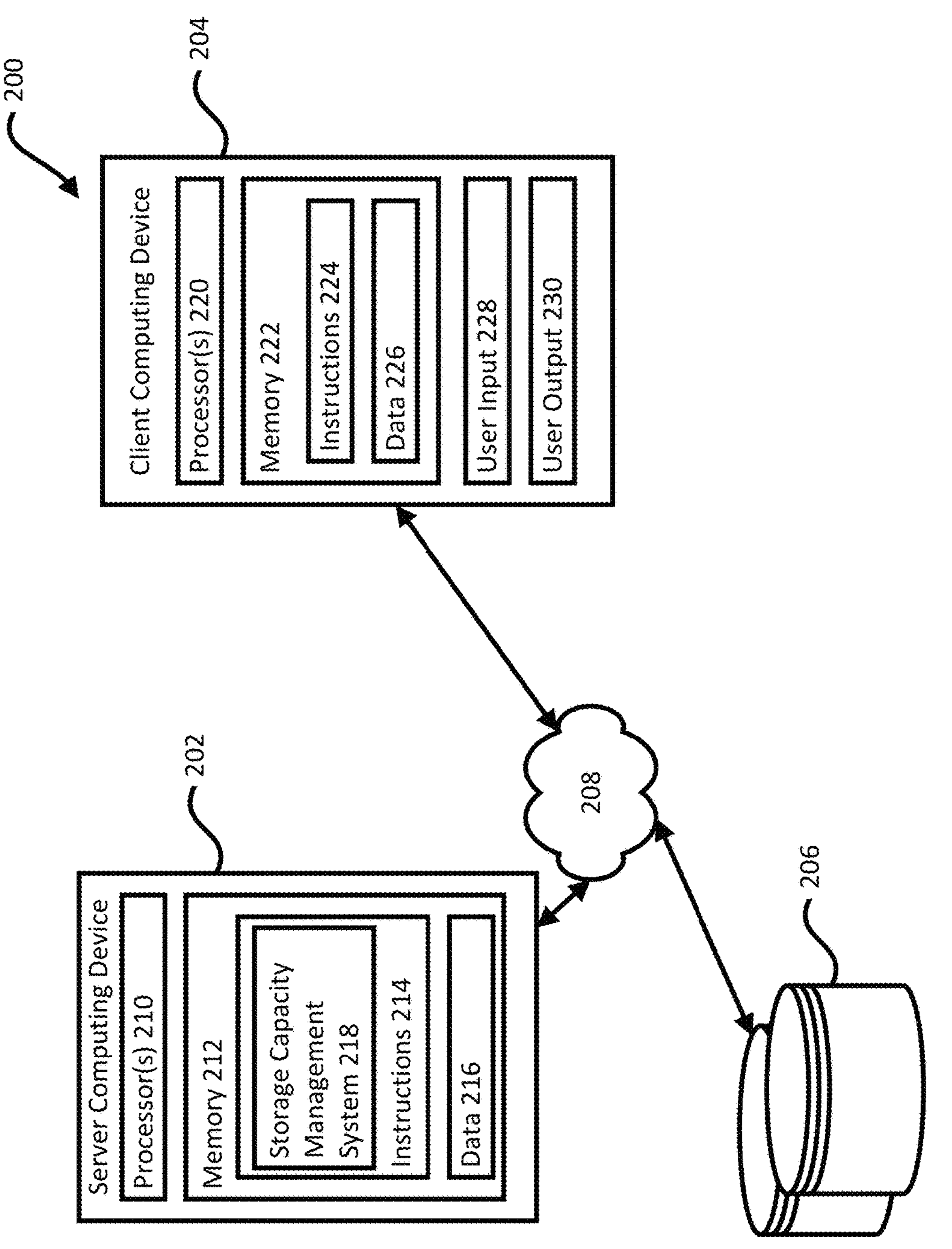
FIG. 3 depicts a block diagram of an example environment for implementing a storage capacity management system according to aspects of the disclosure.

FIG. 3 depicts a block diagram of an example environment 200 for implementing a storage capacity management system 218. The storage capacity management system 218 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing storage capacity management system 218, which can correspond to the storage capacity management system 100 of FIG. 2. The storage capacity management system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 3 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be configured to receive requests to process data from the client computing device 204. For example, the environment 200 can be part of a computing platform configured to provide a variety of services to users, through various user interfaces and/or application programming interfaces (APIs) exposing the platform services. The variety of services can include techniques for storage capacity management. The client computing device 204 or another server computing device can transmit input data associated with whether to initiate one or more space reclamations and/or one or more mitigation mechanisms for reducing storage usage. The server computing device 202 can receive the input data, and in response, generate output data including instructions associated with the one or more space reclamations and/or one or more mitigation mechanisms.

The devices 202, 204 can be capable of direct and indirect communication over the network 208. For example, using a network socket, the client computing device 204 can connect to a service operating in a data center through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHZ and 5 GHz, commonly associated with the Wi-Fi® communication protocol; or with a variety of communication standards, such as the LTE® standard for wireless broadband communication. The network 208, in addition or alternatively, can also support wired connections between the devices 202, 204, including over various types of Ethernet connection.

Although a single server computing device 202, client computing device 204, and storage medium 206 are shown in FIG. 3, it is understood that the aspects of the disclosure can be implemented according to a variety of different configurations and quantities of computing devices, including in paradigms for sequential or parallel processing, or over a distributed network of multiple devices.

Figure 4:
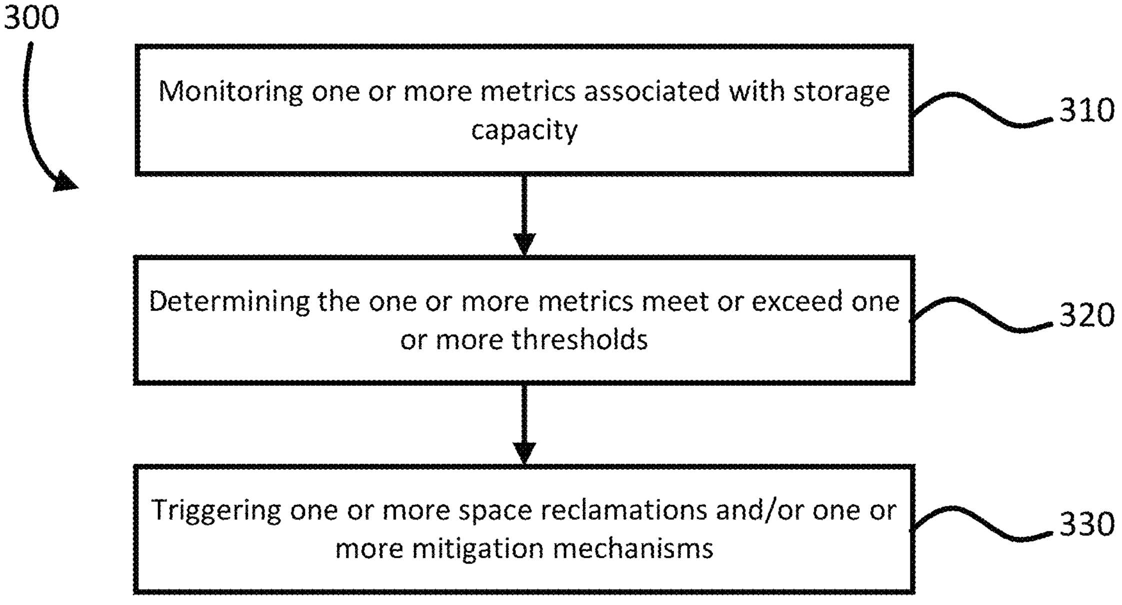
FIG. 4 depicts a flow diagram of an example process for managing storage capacity in one or more storage systems according to aspects of the disclosure.

FIG. 4 depicts a flow diagram of an example process 300 for managing storage capacity in one or more storage systems, such as the storage system 10 as depicted in FIG. 1. The example process 300 can be performed on a system of one or more processors in one or more locations, such as the storage capacity management system 100 as depicted in FIG. 2.

As shown in block 310, the storage capacity management system 100 can monitor one or more metrics associated with storage capacity. The one or more metrics can include an amount of time since a background space reclamation has been performed, a file density for the one or more storage systems, a storage usage for the one or more storage systems, and/or whether an external trigger has been received. The amount of time since a background space reclamation has been performed can be based on a last-compacted timestamp included in file logs appended to read/write requests. The file density for the one or more storage systems can be based on a percentage of blocks not overwritten in the one or more storage systems. The storage usage for the one or more storage systems can be based on a percentage or amount of available storage capacity in the one or more storage systems. The external trigger can be based on receiving instructions from a client device or other computing device.

As shown in block 320, the storage capacity management system 100 can determine that the one or more metrics meet or exceed one or more thresholds. The storage capacity management system 100 can determine that the amount of time since a background space reclamation has been performed meets or exceeds an idling threshold, that the file density for the one or more storage systems meets or is below a density threshold, that the storage usage for the one or more storage systems meets or exceeds a storage usage threshold, and/or that an external trigger was received. The storage capacity management system 100 can compare the amount of time since the background space was performed to the idling threshold, compare file density percentage to the density threshold, and/or compare the storage usage percentage or capacity to the storage usage threshold.

As shown in block 330, the storage capacity management system 100 can trigger one or more space reclamations and/or one or more storage usage mitigation mechanisms in response to determining that one or more of the metrics meet or exceed the respective thresholds. The one or more space reclamations can include an in-process space reclamation bound to one or more write processes for the one or more storage systems, such as by running on the same hardware and/or having the same software package as the one or more write processes. The one or more space reclamations can further include a space reclamation that runs on software older than the in-process space reclamation. The space reclamation that runs on the older software can also be an in-process space reclamation. The one or more storage usage mitigation mechanisms can include adjusting a basis for the write processes, such as by adjusting traffic routing, data transcoding, and/or data compressing.

For example, the one or more storage usage mitigation mechanisms can include routing incoming traffic or a portion of incoming traffic to a HDD if the one or more storage systems include an SSD, to an SSD if the one or more storage systems include a HDD, and/or to a combination of HDD and SSD if the one or more storage systems include both a HDD and SSD. As another example, the one or more storage usage mitigation mechanisms can include routing incoming traffic to a wider RAID storage, storage remote from the one or more storage systems, and/or storage at a different geographical location from the one or more storage systems.

As yet another example, the one or more storage usage mitigation mechanisms can include transcoding data to more efficient storage encoding, such as Reed-Solomon encoding or a wider Reed-Solomon encoding schema. As yet another example, the one or more storage usage mitigation mechanisms can include compressing data or implementing more efficient compression, such as compression based on different compression levels, e.g., Zstandard compression levels, with a higher compression ratio.

Figure 5:
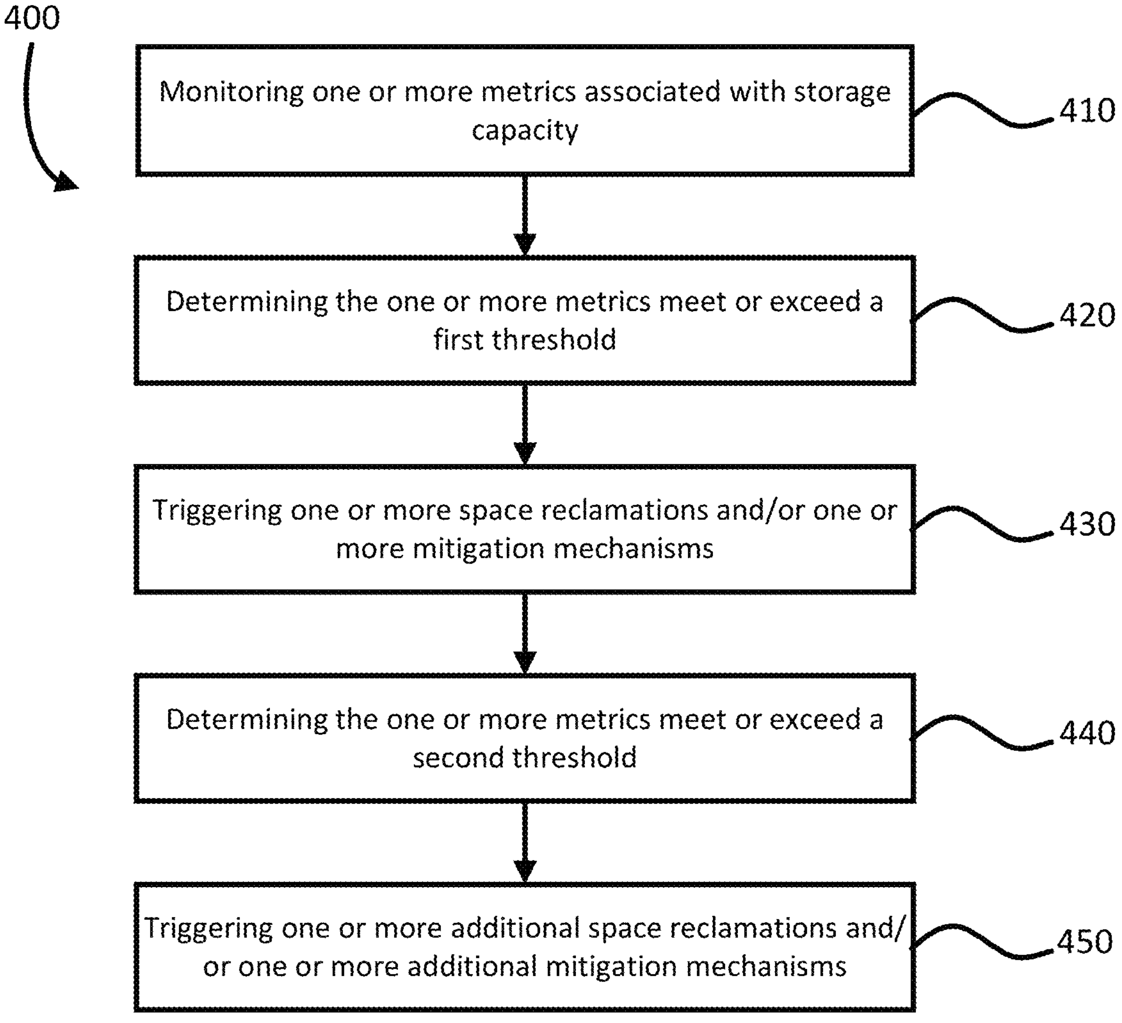
FIG. 5 depicts a flow diagram of an example process for managing storage capacity in one or more storage systems using different thresholds according to aspects of the disclosure.

FIG. 5 depicts a flow diagram of an example process 400 for managing storage capacity in one or more storage systems using different thresholds. Additional and/or alternative space reclamations or mitigation mechanisms can be performed depending on the threshold level that is met or exceeded. The example process 400 can be performed on a system of one or more processors in one or more locations, such as the storage capacity management system 100 as depicted in FIG. 2.

As shown in block 410, the storage capacity management system 100 can monitor one or more metrics associated with storage capacity. The one or more metrics can include an amount of time since a background space reclamation has been performed, a file density for the one or more storage systems, a storage usage for the one or more storage systems, and/or whether an external trigger has been received. The amount of time since a background space reclamation has been performed can be based on a last-compacted timestamp included in file logs appended to read/write requests. The file density for the one or more storage systems can be based on a percentage of blocks not overwritten in the one or more storage systems. The storage usage for the one or more storage systems can be based on a percentage or amount of available storage capacity in the one or more storage systems. The external trigger can be based on receiving instructions from a client device or other computing device.

As shown in block 420, the storage capacity management system 100 can determine that the one or more metrics meet or exceed a first threshold. The first threshold can be the idling threshold, the density threshold, or the storage usage threshold. The storage capacity management system 100 can compare the amount of time since the background space was performed to the idling threshold, compare file density percentage to the density threshold, and/or compare the storage usage percentage or capacity to the storage usage threshold.

As shown in block 430, the storage capacity management system 100 can trigger one or more space reclamations and/or one or more storage usage mitigation mechanisms in response to determining that one or more of the metrics meet or exceed the first threshold. The one or more space reclamations can include an in-process space reclamation bound to one or more write processes for the one or more storage systems. The one or more space reclamations can further include a space reclamation that runs on older software than the in-process space reclamation. The one or more storage usage mitigation mechanisms can include adjusting a basis for the write processes, such as by adjusting traffic routing, data transcoding, and/or data compressing.

As shown in block 440, the storage capacity management system 100 can determine that the one or more metrics exceed a second threshold. The second threshold can be a different threshold from the first threshold. For example, if the first threshold is the idling threshold, the second threshold can be the storage usage threshold. Additionally or alternatively, the second threshold can be a higher level of the first threshold. For example, if the first threshold is the storage usage threshold at 80% storage capacity, the second threshold can also be a storage usage threshold but at 90% storage capacity.

As shown in block 450, the storage capacity management system 100 can trigger one or more additional space reclamations and/or one or more additional mitigation mechanisms in response to determining that one or more of the metrics meet or exceed the second threshold. For example, if meeting the first threshold triggered the in-process space reclamation, then triggering the second threshold can trigger the space reclamation running on older software. As another example, if meeting the first threshold triggered adjusting traffic routing, then triggering the second threshold can trigger adjusting data compression. As yet another example, if meeting the first threshold triggered the in-process space reclamation, then triggering the second threshold can trigger adjusting traffic routing.

Figure 6:
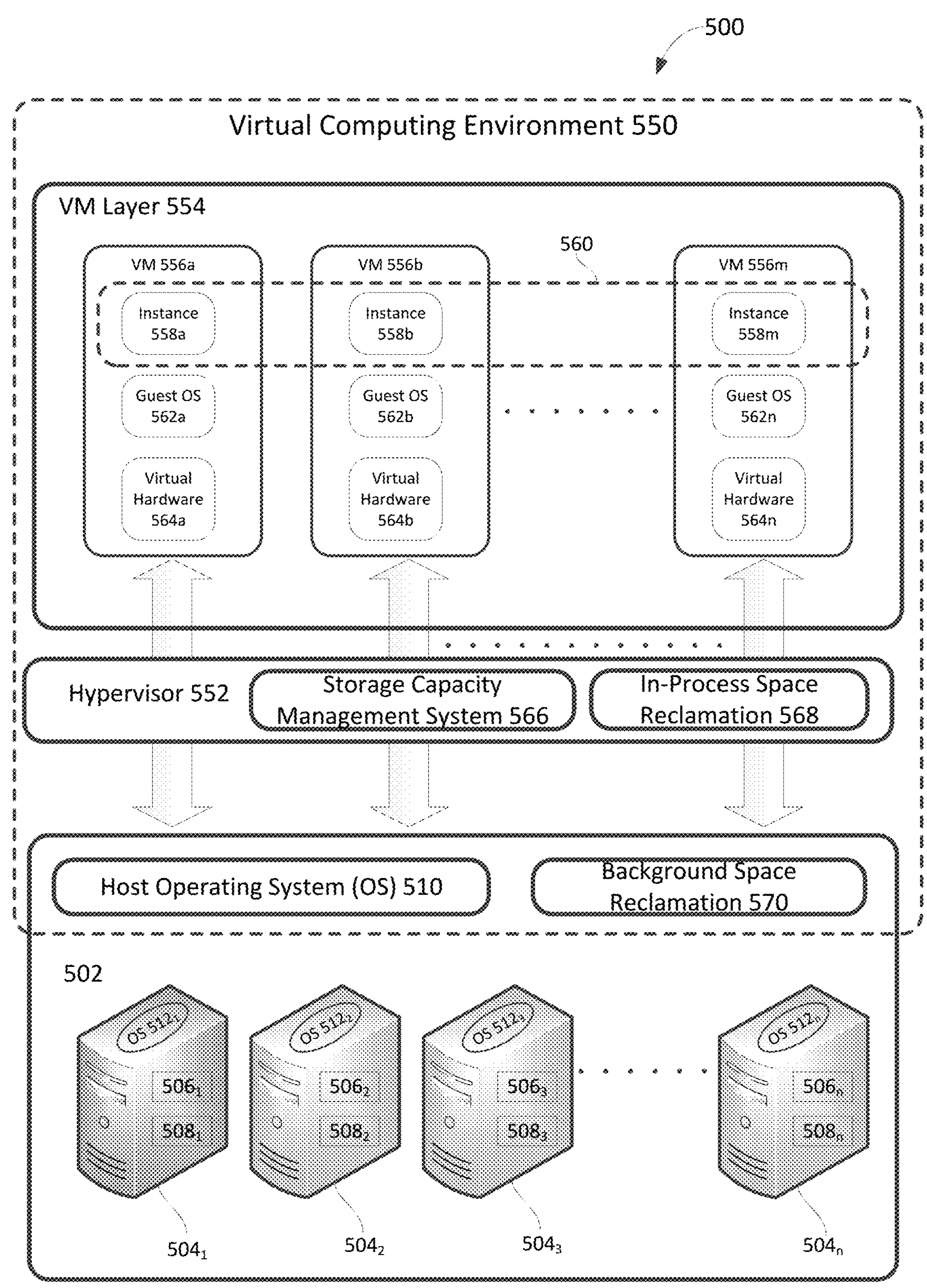
FIG. 6 depicts a block diagram of an example cloud-based platform to implement a storage capacity management system according to aspects of the disclosure.

FIG. 6 depicts a block diagram of an example cloud-based platform 500 to implement a storage capacity management system, such as the storage capacity management system 100 of FIG. 2. The platform 500 can include a collection 502 of host or physical machines 504, e.g., hardware resources, supporting or executing a virtual computing environment 550. The virtual computing environment 550 can include a virtual machine manager or hypervisor 552 and a virtual machine layer 554 running one or more virtual machines 556 configured to execute instances 558 of one or more applications 560.

Each physical machine 504 can include one or more physical processors 506, e.g., data processing hardware, and associated physical memory 508, e.g., memory hardware. While each physical machine 504 is shown having a single physical processor 506, the physical machines 504 can include multiple physical processors 506. The physical machines 504 can also include physical memory 508, which may be partitioned by a host operating system (OS) 510 into virtual memory and assigned for use by the virtual machines 556, the hypervisor 552, or the host OS 510. Physical memory 508 can include random access memory (RAM) and/or disk storage, such as SSD storage. The collection 502 of host or physical machines 504 can further include a background space reclamation 570 configured to reclaim storage space occupied by data that is no longer useful, such as data occupied by deleted files or objects, or data occupied by blocks that have since been overwritten.

The host OS 510 can execute on a given one of the physical machines 504 or can be configured to operate across a plurality of the host machines 504. Further, while the host OS 510 is illustrated as being part of the virtual computing environment 550, each physical machine 504 can be equipped with its own OS 512. The OS 512 on each physical machine 504 can be managed as a collective OS 510 to the hypervisor 552 and the virtual machine layer 554.

The hypervisor 552 can correspond to a compute engine that includes at least one of software, firmware, or hardware configured to create, instantiate/deploy, and execute the virtual machines 556. The hypervisor 552 can include a storage capacity management system 566. The storage capacity management system 566 can correspond to the storage capacity management system 100 of FIG. 2. While shown as part of the hypervisor 552 in FIG. 6, in other implementations, the storage capacity management system 566 can be part of the VM layer 554. The hypervisor can further include one or more in-process space reclamations 568 as a fallback to the background space reclamation 570.

Each virtual machine 556 can be referred to as a guest machine. The hypervisor 552 can be configured to provide each virtual machine 556 with a corresponding guest OS 562 having a virtual operating platform and to manage execution of the corresponding guest OS 562 on the virtual machine 556. In some examples, multiple virtual machines 556 with a variety of guest OSs 562 can share virtualized resources. For example, virtual machines of different operating systems can all run on a single physical host machine.

The host OS 510 can virtualize underlying host machine hardware and manage concurrent execution of a guest OS 562 on the one or more virtual machines 556. For example, the host OS 510 can manage the virtual machines 556 to include a simulated version of the underlying host machine hardware or a different computer architecture. The simulated version of the hardware associated with each virtual machine 556 can be referred to as virtual hardware 564.

The virtual hardware 564 can include one or more virtual processors, such as virtual central processing units (vCPUs), emulating one or more physical processors 506 of a physical machine 504. The virtual processors can be interchangeably referred to as a computing resource associated with the virtual machine 556. The computing resource can include a target computing resource level required for executing the corresponding individual service instance 558 of the application 560.

The virtual hardware 564 can further include virtual memory in communication with the virtual processor and storing guest instructions executable by the virtual processor for performing operations. The virtual memory can be interchangeably referred to as a memory resource associated with the virtual machine 556. The memory resource can include a target memory resource level required for executing the corresponding individual service instance 558.

The virtual hardware 564 can also include at least one virtual storage device that provides runtime capacity for the service on the host machine 504. At least one virtual storage device may be referred to as a storage resource associated with the virtual machine 556. The storage resource may include a target storage resource level required for executing the corresponding individual service instance 558.

The virtual processor can execute instructions from the virtual memory that cause the virtual processor to execute a corresponding individual service instance 558 of the software application 560. The individual service instance 558 can be referred to as a guest instance that cannot determine if it is being executed by the virtual hardware 564 or the physical machine 504. The processors 506 of the host machine 504 can enable the virtual hardware 564 to execute software instances 558 of the application 560 efficiently by allowing guest software instructions to be executed directly on the processor 506 of the host machine 504 without requiring code-rewriting, recompilation, or instruction emulation.

The guest OS 562 executing on each virtual machine 556 can include software that controls the execution of the corresponding individual service instance 558 of the application 560 by the virtual machines 556. The guest OS executing on a virtual machine can be the same or different as other guest OSs executing on other virtual machines. The guest OS 562 executing on each virtual machine 556 can further assign network boundaries, e.g., allocate network addresses, through which respective guest software can communicate with other processes reachable through infrastructure, such as an internal network. The network boundaries may be referred to as a network resource associated with the virtual machine 556.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for reducing emergency storage capacity of a storage system, the method comprising:
- monitoring, by one or more processors, an amount of time since a background space reclamation has been performed;
- determining, by the one or more processors, that the amount of time since the background space reclamation has been performed meets or exceeds an idling threshold;
- based on determining that the amount of time meets or exceeds the idling threshold, triggering, by the one or more processors, an in-process space reclamation separate from the background space reclamation, the in-process space reclamation being bound to one or more write processes for the storage system by running on the same hardware and being programmed in a same memory address space as the one or more write processes;
- monitoring, by the one or more processors, a storage usage for the storage system;
- determining, by the one or more processors, that the storage usage meets or exceeds a storage usage threshold; and
- based on determining that the storage usage meets or exceeds the storage usage threshold, triggering, by the one or more processors, the in-process space reclamation and adjusting, by the one or more processors, a basis for the write processes, wherein the adjusting further comprises at least one of:
  - transcoding data to a wider encoding scheme; or
  - performing data compression on incoming traffic, including initiating compression of incoming traffic or increasing a compression ratio for the incoming traffic.

2. The method of claim 1, wherein the in-process space reclamation is bound to the one or more write processes by having the same software package as the one or more write processes.

3. The method of claim 1, further comprising:
- monitoring, by the one or more processors, a file density for the storage system, the file density being based on a number of blocks overwritten in the storage system;
- determining, by the one or more processors, that the file density meets or is below a density threshold; and
- triggering, by the one or more processors, the in-process space reclamation.

4. The method of claim 1, wherein adjusting the basis for the write processes further comprises routing incoming traffic or a portion of the incoming traffic to a hard disk drive (HDD) if the storage system is a solid state drive (SSD) or to a SSD if the storage system is a HDD.

5. The method of claim 1, wherein adjusting the basis for the write processes further comprises moving data to at least one of a wider redundant array of independent disks (RAID), remote storage, or storage at a different geographical location.

6. The method of claim 1, wherein the storage usage threshold comprises multiple threshold levels and different mitigation mechanisms are performed at each of the multiple threshold levels.

7. The method of claim 1, further comprising triggering, by the one or more processors, a space reclamation that runs on older software than the in-process space reclamation.

8. A system comprising:
- one or more processors; and
- one or more storage devices coupled to the one or more processors and storing instructions that, when executed by the one or more processors, cause the one or more processors to perform operations for reducing emergency storage capacity of a storage system, the operations comprising:
  - monitoring an amount of time since a background space reclamation has been performed;
  - determining that the amount of time since the background space reclamation has been performed meets or exceeds an idling threshold;
  - based on determining that the amount of time meets of exceeds the idling threshold, triggering an in-process space reclamation separate from the background space reclamation, the in-process space reclamation being bound to one or more write processes for the storage system by running on the same hardware and being programmed in a same memory address space as the one or more write processes;
  - monitoring a storage usage for the storage system;
  - determining that the storage usage meets or exceeds a storage usage threshold; and
  - based on determining that the storage usage meets or exceeds the storage usage threshold, triggering the in-process space reclamation and adjusting a basis for the write processes, wherein the adjusting further comprises at least one of:
    - transcoding data to a wider encoding scheme; or
    - performing data compression on incoming traffic, including initiating compression of incoming traffic or increasing a compression ratio for the incoming traffic.

9. The system of claim 8, wherein the in-process space reclamation is bound to the one or more write processes by having the same software package as the one or more write processes.

10. The system of claim 8, wherein the operations further comprise:
- monitoring a file density for the storage system, the file density being based on a number of blocks overwritten in the storage system;
- determining that the file density meets or is below a density threshold; and
- triggering the in-process space reclamation.

11. A non-transitory computer readable medium for storing instructions that, when executed by one or more processors, cause the one or more processors to perform operations for reducing emergency storage capacity of a storage system, the operations comprising:
- monitoring an amount of time since a background space reclamation has been performed;
- determining that the amount of time since the background space reclamation has been performed meets or exceeds an idling threshold;
- based on determining that the amount of time meets or exceeds the idling threshold, triggering an in-process space reclamation separate from the background space reclamation, the in-process space reclamation being bound to one or more write processes for the storage system by running on the same hardware and being programmed in a same memory address space as the one or more write processes;

monitoring a storage usage for the storage system;

determining that the storage usage meets or exceeds a storage usage threshold; and based on determining that the storage usage meets or exceeds the storage usage threshold, triggering the in-process space reclamation and adjusting a basis for the write processes, wherein the adjusting further comprises at least one of:

transcoding data to a wider encoding scheme; or performing data compression on incoming traffic, including initiating compression of incoming traffic or increasing a compression ratio for the incoming traffic.

12. The non-transitory computer readable medium of claim 11, wherein the operations further comprise:

monitoring a file density for the storage system, the file density being based on a number of blocks overwritten in the storage system;

determining that the file density meets or is below a density threshold; and triggering the in-process space reclamation.

* * * * *